Figure 1:
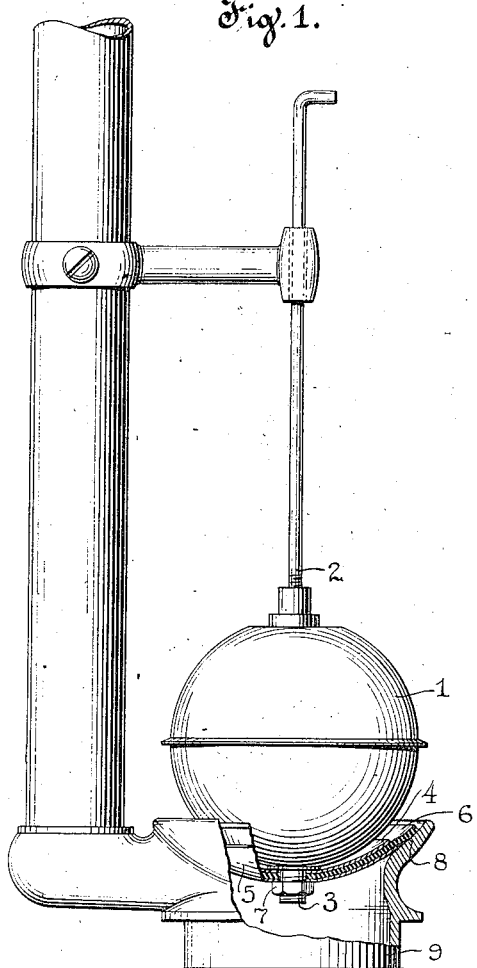

A. B. SCHIER.
FLOAT VALVE.
APPLICATION FILED JAN. 6, 1917.

1,230,929.

Patented June 26, 1917.

INVENTOR.
Adolph B. Schier
BY Frank H. Hubbard
ATTORNEY

UNITED STATES PATENT OFFICE.

ADOLPH B. SCHIER, OF MILWAUKEE, WISCONSIN.

FLOAT-VALVE.

1,230,929.

Specification of Letters Patent.

Patented June 26, 1917.

Application filed January 6, 1917. Serial No. 140,877.

*To all whom it may concern:*

Be it known that I, ADOLPH B. SCHIER, a subject of the Emperor of Austria-Hungary, residing at Milwaukee, in the county of Milwaukee and State of Wisconsin, have invented new and useful Improvements in Float-Valves, of which the following is a full, clear, concise, and exact description, reference being had to the accompanying drawing, forming a part of this specification.

This invention relates to float valves and is particularly applicable to such valves of flushing tanks.

Various types of float valves have been proposed for such tanks but the rubber ball type is by far the most commonly employed type, although it is notoriously unsatisfactory in many respects. For example, this type of valve is difficult to fit to the varying size valve seats of fittings marketed by the different manufacturers and is subject to rapid deterioration both in and out of service. Again, such valves are unreliable in action even when in prime condition, because of their tendency to stick in off-centered relation with their seats and to stick against an unseating pull.

The present invention has among its objects to provide a float valve overcoming the aforesaid and other disadvantages of rubber balls or floats and one which may be manufactured at a comparatively low cost.

A further object is to provide a non-sticking, rugged and durable float valve, which may be used without alteration in seats heretofore requiring several different sizes of float valves of ordinary construction.

A still further object is to provide a float valve wherein a very simple and inexpensive washer of leather or other suitable material serves as the sole flexible or yielding part thereof and one adapted to center itself in its seat and substantially close the port therein prior to seating of said washer.

Various other objects and advantages will hereinafter appear.

The accompanying drawing illustrates one embodiment of the invention together with a modification thereof and the same will now be described, it being understood that the invention is susceptible of other modifications falling within the scope of the appended claims.

Figure 2:
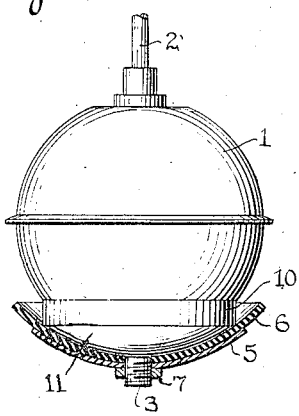

In the drawing,

Figure 1 shows partially in elevation and partially in section one form of float valve employed with a flushing tank fitting of a well known type and, Fig. 2 shows in elevation a modified float valve.

Referring to Fig. 1, the float valve comprises an ordinary metallic ball float 1 having a supporting stem 2 and a diametrically opposed threaded nipple 3 upon which are clamped two washers 4 and 5 preferably metallic and an interposed washer 6 preferably of leather, said washers being secured by a clamping nut 7 threaded onto said nipple. The washers 4 and 5 are convexo-concave to nest one within the other and to correspondingly shape the flexible washer 6, the latter being of slightly greater diameter than the former washers and being marginally free. The washer 5 is preferably formed of thin material and curved on a radius slightly greater than the concave seat 8 provided therefor in the fitting 9, which, as stated, is of a well known type commonly employed for flushing tanks.

Thus it will be observed that the float valve described is of exceedingly simple and durable construction and when lowered to its seat first presents thereto the washer 5. This washer if of metal will then readily slip into centered relation with the seat and if curved on a slightly increased radius will make linear engagement therewith. Thus if the seat is reasonably accurately formed, the washer 5 will substantially seal the outlet port therein and in this connection it will be noted that the washer 5 will function as described irrespective of such variations in the concavity of seats as are met with in commercial flush valve fittings. Then when the washer 5 has centered and seated the free marginal portion of the flexible washer 6 will under the direct pressure of the water flowing into the tank spread and firmly engage the seat, adjusting itself to any irregularities or imperfections thereof to effectually seal the outlet port therein. And here it is to be noted that the curvature of the rigid washers upon a slightly greater radius than that of the seat insures free play of the washer to flatten out against said seat. Also, it is to be noted that the construction described insures against wedging of the valve into its seat and consequent sticking of the former when subject to an unseating pull.

Referring now to Fig. 2, the same shows a modified ball float having as an integral part thereof an extension 10 provided with a convex surface 11 affording a backing for the flexible washer 6. This form of float thus obviates the necessity for the washer 4 of Fig. 1 and might be advantageous in certain instances. Otherwise the construction of this float is the same as that described.

What I claim as new and desire to secure by Letters Patent is:

1. The combination with a fitting having therein a tapered valve seat, of a float valve having a rigid part to initially seat in said fitting and further having a flexible washer marginally free to fit said valve seat under the fluid pressure exerted thereon after seating of said rigid part.

2. The combination with a fitting having therein a concave valve seat, of a float valve having a rigid convex washer to initially engage said seat and a convex flexible washer of greater diameter and marginally free for snug engagement with said valve seat under fluid pressure following the seating of said rigid washer.

3. The combination with a fitting having therein a concave valve seat, of a float valve having a rigid convex washer to initially engage said seat, the radius of curvature of the former being greater than that of the latter and a convex flexible washer overhanging said rigid washer and marginally free for snug engagement with said seat under fluid pressure following the seating of said rigid washer.

4. As an article of manufacture, a float valve comprising a float, a rigid convexo-concave washer fixed to said float and an interposed flexible washer nested in said rigid washer, the former being of greater radius than the latter and marginally free of said float.

5. As an article of manufacture, a float valve comprising a ball float, a pair of rigid and nesting convexo-concave washers fixed thereto and a flexible washer interposed between said rigid washers, said flexible washer being of greater diameter than said rigid washers.

In witness whereof, I have hereunto subscribed my name.

ADOLPH B. SCHIER.